July 29, 1941.     G. I. GOODWIN     2,251,128
CLUTCH PLATE
Filed Jan. 25, 1940         4 Sheets-Sheet 1
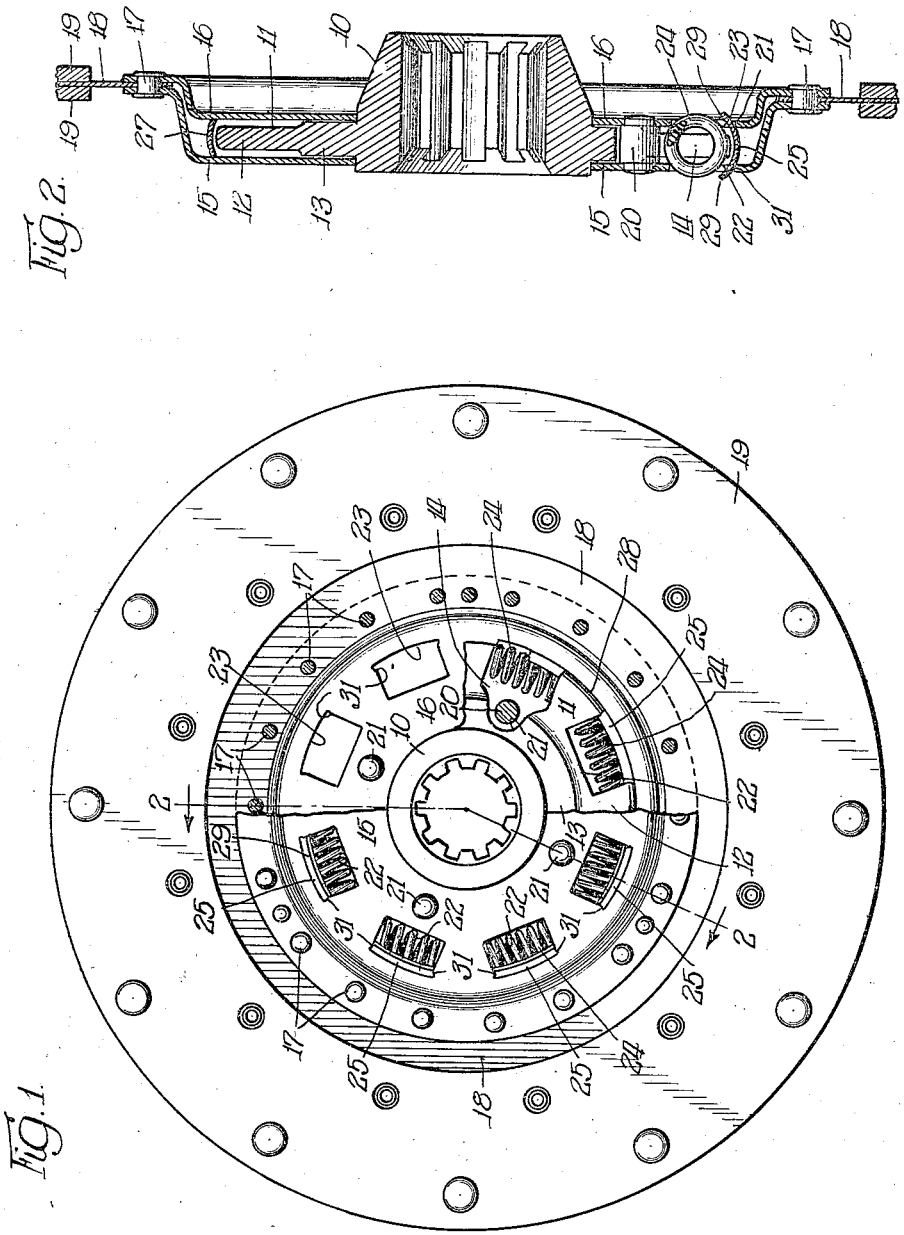
INVENTOR.
George I. Goodwin,
BY Cromwell, Greist + Warden.
ATTORNEYS.

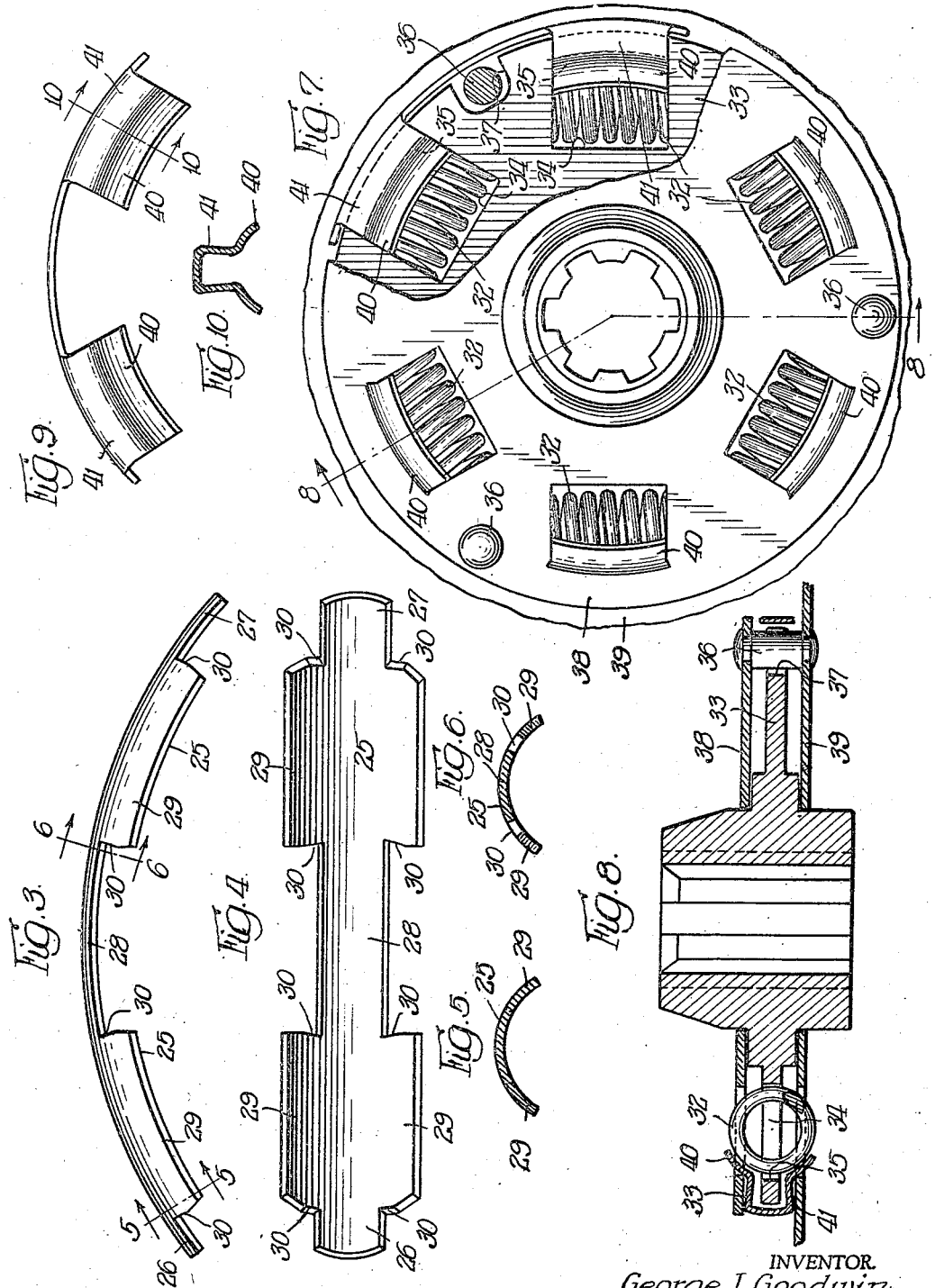

July 29, 1941.  G. I. GOODWIN  2,251,128
CLUTCH PLATE
Filed Jan. 25, 1940  4 Sheets-Sheet 3
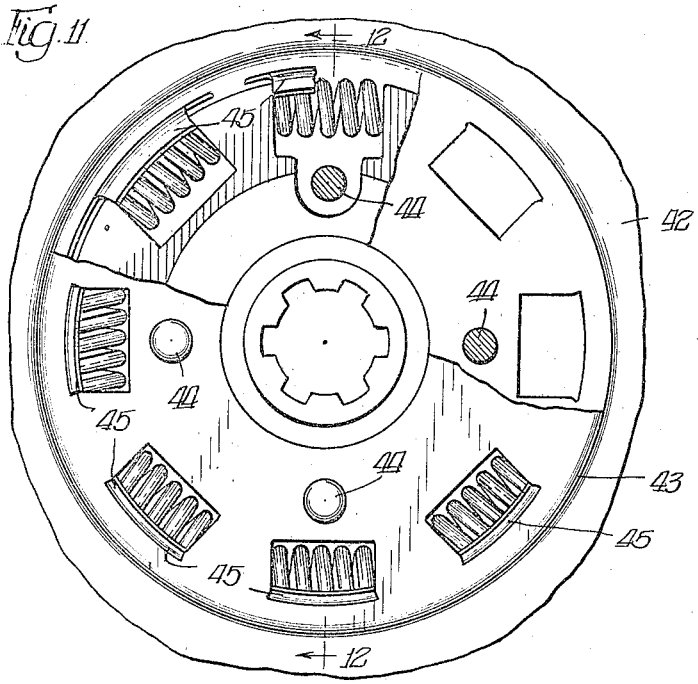
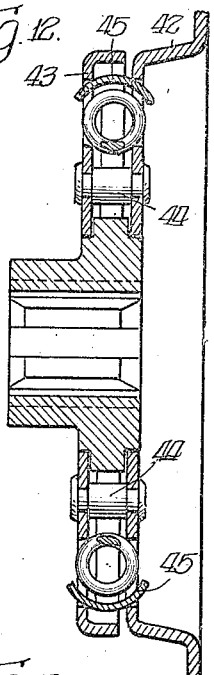
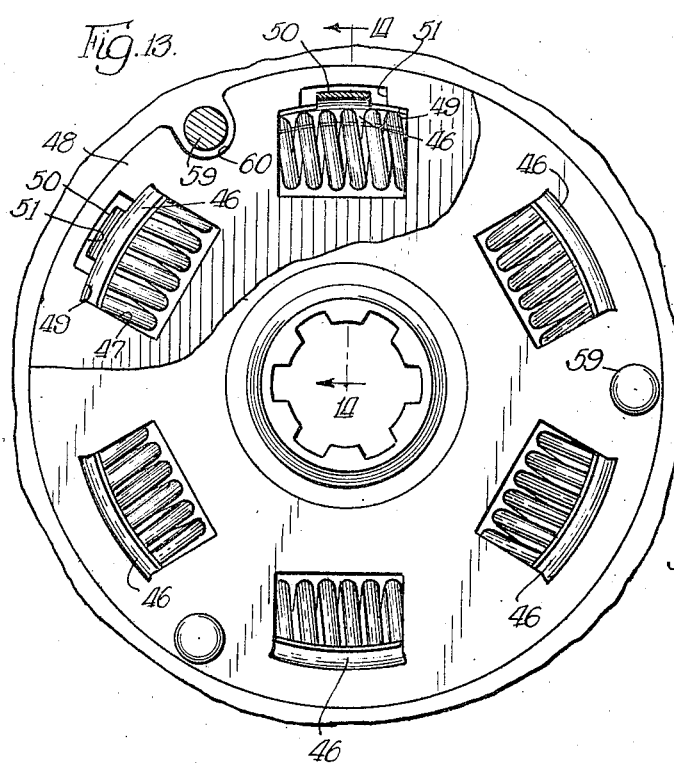
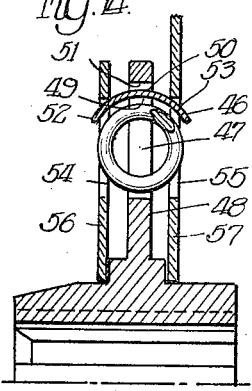
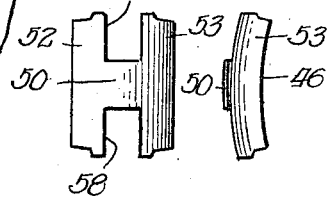
INVENTOR.
George I. Goodwin,
BY Cromwell, Greist & Warden
ATTORNEYS.

July 29, 1941.  G. I. GOODWIN  2,251,128
CLUTCH PLATE
Filed Jan. 25, 1940  4 Sheets-Sheet 4
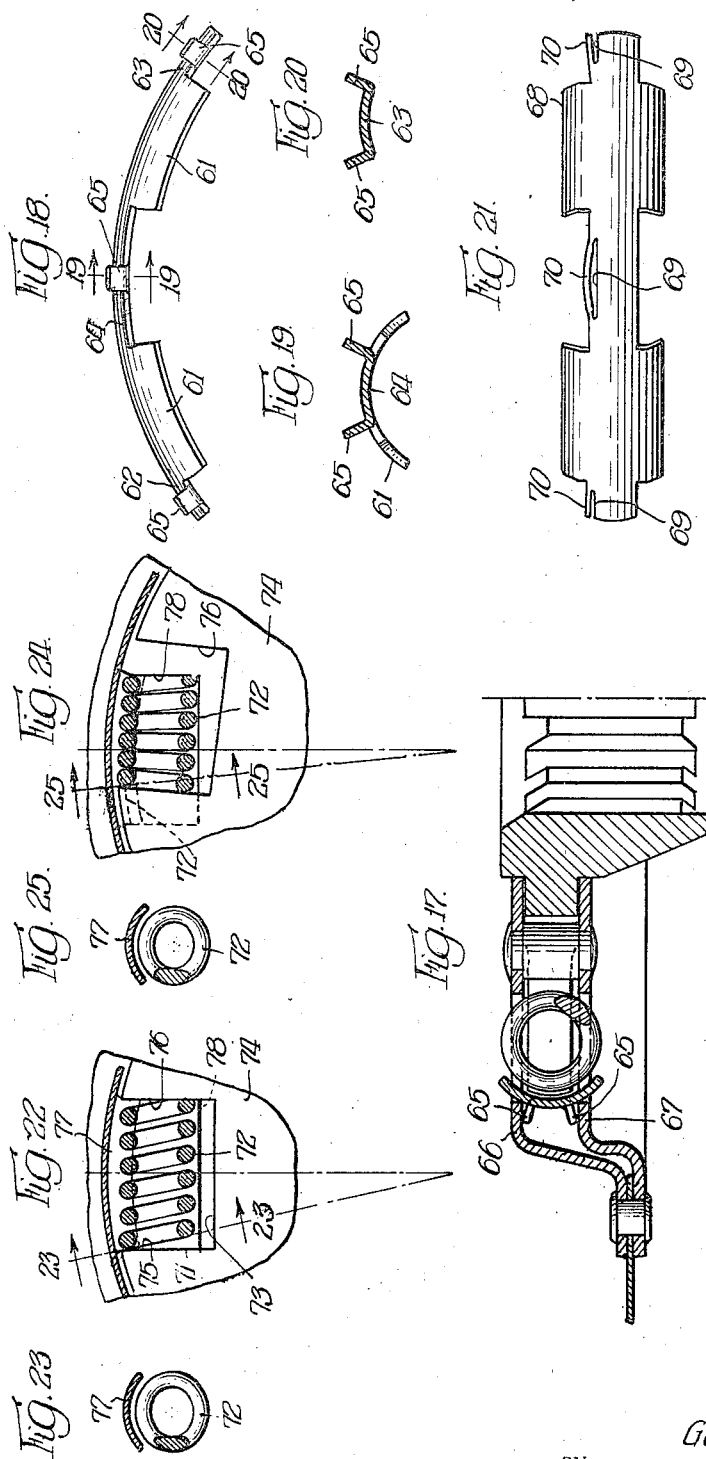
INVENTOR.
George I. Goodwin,
BY Cromwell, Greist & Warden
ATTORNEYS.

Patented July 29, 1941

2,251,128

UNITED STATES PATENT OFFICE 2,251,128

CLUTCH PLATE

George I. Goodwin, Detroit, Mich.

Application January 25, 1940, Serial No. 315,562

10 Claims. (Cl. 192—68)

This invention has to do with clutch plates of the spring center type, in which a plurality of small coil springs are provided for yieldingly resisting relative circumferential movement between the inner and outer portions of the plate.

The principal object of the invention is to provide, in a clutch plate of the spring center type, improved retaining means for the springs in the form of separate trough-like members in which the outer sides of the ends of the springs are guidingly supported in their movement.

These retainers are so shaped as to conform to the path of movement of the outer sides of the ends of the springs, cooperate with the spring openings in the associated parts to insure proper positioning of the springs without in any way interfering with the relative circumferential movement between the inner and outer portions of the plate, materially strengthen the plate, are inexpensive to manufacture, and are easy to assemble with the springs and other parts.

While the foregoing statements are indicative in a general way of the nature of the invention, other more specific objects and advantages will be evident to those skilled in the art upon a full understanding of the construction, arrangement and operation of the novel retainers.

A preferred embodiment and a few modifications thereof, are presented herein for the purpose of exemplification, but it will of course be appreciated that the invention is susceptible of embodiment in still other structurally modified forms coming equally within the scope of the appended claims.

In the accompanying drawings:

Fig. 1 is a face view of a clutch plate equipped with spring retainers constructed in accordance with the invention, with certain of the parts of the plate broken away progressively about the circumference of the plate to reveal the construction and arrangement of the otherwise concealed parts;

Fig. 2 is a section through the same plate, taken on the irregular line 2—2 of Fig. 1;

Fig. 3 is a side view of one of the spring retainers used in the plate;

Fig. 4 is an inside face view of the same retainer;

Figs. 5 and 6 are sections through the retainer taken respectively on the lines 5—5 and 6—6 of Fig. 3;

Fig. 7 is a view, corresponding to Fig. 1, of a modified structure employing the invention;

Fig. 8 is a section through the plate shown in Fig. 7, taken on the irregular line 8—8 of Fig. 7;

Fig. 9 is a side view of one of the spring retainers used in this plate;

Fig. 10 is a section through the retainer, taken on the line 10—10 of Fig. 9;

Figs. 11 and 12 are views, corresponding generally to Figs. 1 and 2, of another modified clutch plate assembly employing the spring retainers of the invention;

Figs. 13 and 14 are views, corresponding generally to Figs. 1 and 2, of still another modified clutch plate assembly utilizing the invention;

Fig. 15 is a side view of one of the retainers employed in the plate of Figs. 13 and 14;

Fig. 16 is an outside face view of this retainer;

Fig. 17 is a radial section through still another clutch plate assembly, illustrating a further embodiment of the invention;

Fig. 18 is a side view of the spring retainer employed in the plate shown in Fig. 17;

Figs. 19 and 20 are sections through this retainer, taken respectively on the lines 19—19 and 20—20 of Fig. 18;

Fig. 21 is an outside face view of a spring retainer on the order of the one employed in the plate of Fig. 17, illustrating a different expedient for obtaining a tight fit of the retainer between the side plates of the outer portion of the assembly;

Fig. 22 is a somewhat schematic fragmentary side view through a clutch plate assembly constructed in accordance with the invention showing the position of one of the springs with respect to its associated retainer before any relative movement has taken place between the inner and outer portions of the clutch plate;

Fig. 23 is a section, taken on the line 23—23 of Fig. 22, showing the cross sectional shape of the retainer at that point;

Fig. 24 corresponds to Fig. 22 but shows the spring after it has been compressed by relative movement of the inner and outer portions of the clutch plate; and Fig. 25 is a section, taken on the line 25—25 of Fig. 24, illustrating again the cross sectional shape of the retainer at that point.

The clutch plate shown in Figs. 1 to 6 inclusive will first be described. This clutch plate includes a centrally splined hub 10 which is provided with a radial flange 11. The outer portion 12 of the flange 11, which is somewhat thinner than the inner portion 13 of the flange, is provided with a plurality of circumferentially spaced spring openings 14. Two centrally apertured side plates 15 and 16 are rotatably mounted on the hub 10, at opposite sides of the flange 11. These side plates are connected at their outer edges by rivets 17 to a peripheral structure 18 on which friction facings 19 are mounted. The plates 15 and 16 are also connected together adjacent their inner edges by relatively large cross studs 20 which are riveted at their ends to the side plates and are accommodated within recesses 21 provided in the flange 11 of the hub at the inner sides of certain of the spring openings 14.

The side plates 15 and 16 are provided with spring openings 22 and 23 in register with the spring openings 14 in the flange 11 of the hub, and coil springs 24 are positioned in these openings, preferably under some initial compression, with their ends in abutment with the ends of the openings. The openings 14 in the flange 11 of the hub have no outer edges, while the openings 22 and 23 in the side plates 15 and 16 are closed along their outer edges. The recesses 21 through which the studs 20 extend are of greater size than the diameter of the studs, whereby to permit the outer portion of the clutch plate, comprising the side plates 15 and 16, to move circumferentially through a small arc with respect to the inner portion of the plate, comprising the flange 11, against the yielding resistance offered by the compressed springs 24.

The springs 24 are held in proper position at all times in the openings 14, 22 and 23 by specially shaped sheet metal retainers 25 which are positioned about the outer periphery of the flange 11 of the hub between the side plates 15 and 16. These retainers 25 are preferably formed in long narrow strips, of two retainers each, and are curved circumferentially about the center of the assembly, as illustrated in Fig. 3. At the locations of the spring openings 22 and 23 the retainers project laterally through such openings, in snugly fitting engagement with the ends of the latter. Throughout the lengths of the spring openings the retainers are transversely curved, in a trough-like shape, whereby to fit about the springs 24 and prevent dislocation of the latter without interfering with the free movement of the springs. The relatively narrow end portions 26 and 27 of the strip carrying the retainers, and the equally narrow connecting portion 28 are preferably of the same width as the space present between the side plates 15 and 16, thereby interiorly reinforcing the latter.

Where the retainers 25 are formed in pairs, as in this particular clutch plate, one of the four lateral extensions 29 on the retainer strip is preferably made a little longer than the other three so as to afford, in connection with each retainer strip, a press-fit engagement of the ends 30 of one of the extensions with one of the spring apertures in one of the side plates. The other extensions preferably fit freely into their apertures, without press fitting, thus insuring easy assembly in spite of the usual manufacturing variations. The end portions 26 and 27 of each retainer strip are preferably of different lengths, so as to enable the person assembling the parts to place the strips quickly in exactly the right positions to obtain the press-fit engagement above referred to.

In assembling the parts, after the flange 11 of the hub has been placed upon one of the side plates, for instance, the side plate 16, with the springs 24 in position in the openings 14 in the flange, the retainer strips are arranged about the springs with the two short-length extensions 29 disposed within two of the openings 23 and with the end and connection portions 26, 27 and 28 of the strip bottomed against the face of the side plate 16. The curved shape of the two connected retainers 25 in the strip will stabilize the strip sufficiently to keep it from tilting out of position pending application of the second side plate 15. After the parts have been preliminarily assembled in this manner, the side plate 15 is placed in position over the retainer strips and forced downwardly under pressure, bringing about a press fit of the longer extension 29 on each retainer strip with one of the openings 22 in that side plate. This results in a tight engagement of each of the retainer strips with one of the side plates and yet does not interfere in any way with ease and rapidity of assembly and does not present the difficulties that otherwise might be encountered due to tolerances normally required in quantity production if press fits for all of the extensions 29 were employed.

The outer corners of the spring openings 22 and 23 in the side plates 15 and 16 are preferably enlarged at 31 to accommodate the lateral extensions 29 of the retainers 25, whereby to interlock with the edges 30 of the retainers in a direction radially of the assembly and insure the retainers being correctly positioned with respect to such openings, not only during the initial assembly operation but also at all other times. The edges 30 are preferably chamfered somewhat to facilitate insertion of the extensions 29 in the enlarged outer corners of the openings 22 and 23.

The cross sectional curvature of the retainers 25, instead of being concentric with the centers of the ends of the springs 24 disposed within the same, are preferably of somewhat flatter curvature in order to correspond with the foreshortened shape of the ends of the springs as viewed on a line passing through the ends of the springs and the center of the clutch plate assembly. This flattened transverse curvature and also the longitudinal curvature of the retainer are preferably such as to conform to the shape and path of movement of the outer sides of the ends of the springs in all positions of the latter.

In the clutch plate shown in Figs. 7 to 10 inclusive the springs 32 are located further away from the outer periphery of the flange 33 of the hub, and the spring openings 34 in the flange are closed along their outer edges 35. The cross studs 36, instead of being located in recesses at the inner edges of the spring openings, are located in separate recesses 37 in the outer periphery of the flange 33 at points intermediate the spring openings, and the side plates 38 and 39 are connected only by the studs 36. The side plate 39 extends radially outward beyond the outer periphery of the side plate 38 to afford a support for, or else connect with some peripheral structure carrying, the usual friction facings. In this clutch plate the trough-like retainers 40 for the springs 32 are again formed in strips of two each and are provided along their centers with U-shaped offset portions 41 which fit about the outer periphery of the flange 33. The sides of these portions 41 are preferably spaced substantially from the sides of the outer periphery of the flange, in order not to interfere with a small amount of universal movement between the inner and outer portions of the clutch plate if and when such movement is needed to compensate for misalignment in shaft organization. In this connection, it will be understood that a small amount of clearance is preferably provided between the center openings in the side plates and the hub and the inner faces of the side plates and the base of the flange on the hub to allow for such universal movement.

In the clutch plate shown in Figs. 11 and 12 the side plate 42 continues outwardly beyond the side plate 43 to support the friction facings, and the side plate 43 is flanged axially at its outer periphery and terminates in slightly spaced relation to the side plate 42. The side plates 42 and 43 are fixedly spaced and rigidly connected adjacent their inner peripheries by movement limiting studs 44. The only connection between the side plates, other than the studs 44, is that afforded by the interlocking engagement of the special spring retainers 45 with both side plates. These retainers cooperate with the studs 44 to reinforce the side plates, making the addition of other peripheral fastening means between the side plates unnecessary.

In the clutch plate shown in Figs. 13 to 16 inclusive, individual spring retainers 46 are employed. In this clutch plate the spring openings 47 in the flange 48 of the hub are closed along their outer edges 49 and the center portions 50 of the retainers are accommodated in recesses 51 formed in the outer edges 49 of the spring openings. The center portions 50 of the retainers are considerably shorter than the laterally curved side portions 52 and 53 thereof which project through the outer portions of the spring openings 54 and 55 of the side plates 56 and 57, leaving deep notches 58 in both ends of the retainers to accommodate the flange 48 in its movement. The recesses 51 in which the center portions 50 of the retainers are positioned are substantially longer than such center portions, so as not to interfere with the movement of the flange 48, such movement being limited, as in the other clutch plates described, by the provision of studs 59 operating in recesses 60 in the flange.

In the clutch plate shown in Figs. 17 to 20 inclusive, the spring retainers 61 are again formed in strips of two each. The end portions 62 and 63 of these strips, and also the connecting portions 64 of the same, are provided with resiliently yieldable tongues 65 which are bent together slightly by the side plates 66 and 67 at the time of assembly. This deformation of the resilient tongues 65 sets up a spring tension in the retaining strips which not only aids in holding the same tightly in place but compensates for any slight variations in the spacing of the side plates incident to their manufacture and assembly.

In Fig. 21 a retainer strip 68 is shown in which much the same resiliently clamped fit is obtained by the provision of slits 69 and laterally deflected portions 70.

In Figs. 22 to 25 inclusive the shape and path of movement of the outer portion of one of the ends 71 of a spring 72 is schematically illustrated. The spring 72 typifies all the springs shown in the various clutch plates herein illustrated and described, being mounted in a spring opening 73 in a hub flange 74 and being compressed between the opposite ends 75 and 76 of the spring opening. The spring 72 is maintained in proper position within the spring opening by one of the retainers 77 which forms the subject matter of this invention. The purpose of these particular views is to illustrate a preferred transverse curvature for the retainer. Fig. 22 shows the spring 72 in its normal position, prior to any relative movement between the spring opening 73 in the hub flange and the then registering spring openings 78 in the side plates. In this position of the spring it will be noted that the end thereof as viewed on the line 23—23 (Fig. 22) is in effect elliptical because of the angular disposition of the radial line 23—23 with respect to the end of the spring and the end 75 of the spring opening. To accommodate this out-of-round shape the retainer 77 is also given an out-of-round shape on the radial line 23—23, thereby insuring a uniform engagement of the outer portion of the end of the spring with the retainer at the beginning of its compression. In Fig. 24 the hub flange 74 has shifted circumferentially with respect to the side plates and it will be observed that the shape of the end of the spring as viewed on the radial line 25—25 is still in effect elliptical, thereby making it desirable to continue the elliptical shaping of the retainer throughout its length.

It will be appreciated from the foregoing that the novel spring retainers of the invention can be made up in many different ways, and that they are not limited in their application to the particular clutch plate structures herein shown and described.

The novel spring retainers of the invention, by being shaped to conform to the projected view of the outer sides of the ends of the springs in all positions of such ends, afford a uniform support for the ends of the springs in which the area of contact is maintained at a maximum, thereby reducing wear and eliminating any localized wear in the retainers and springs which might otherwise result in failure. The curved side portions of the retainers are so located as to naturally maintain the springs centered with respect to the flange of the hub and both side plates. The retainers, in the course of their manufacture, are preferably case hardened, oil quenched and then re-struck to give them exactly the desired form. This process results in a hard wearing surface for the springs at but little cost and makes hardening of the side plates unnecessary. The construction of the spring retaining means as separate parts in the assembly, as distinguished from integral formations on other of the parts, permits this hardening of the wear surfaces, and also allows the use of springs of different diameters with the same flange and side plates, as merely the radius of the retainers need to be altered to permit of such change. The retainers, in addition to providing cradle-like housings in which the outer sides of the ends of the springs will slide, cooperate with the inner edges of the spring openings in the side plates to prevent the springs from moving sidewise. The retainers also materially assist the stop rivets in maintaining the proper spacing and angular relationship between the spring openings and the side plates. The retainers preferably curve about the springs through an angle of approximately 120°, with a curvature of about 60° on each side of the center, although it of course will be appreciated that various other degrees of encirclement may be employed.

I claim:

1. In a clutch plate assembly of the spring center type, relatively rotatable inner and outer portions, one of said portions having a flange and the other of said portions having side plates at opposite sides of the flange, said flange and side plates being provided with normally registering spring openings, spring means positioned in the openings for yieldingly permitting relative rotation between the flange and the side plates through a small arc, and separate retainers disposed radially outward of the spring means for preventing displacement of the latter.

2. In a clutch plate assembly of the spring center type, a hub having a flange, a friction disk having side plates at opposite sides of the flange, said flange and side plates being provided with normally registering spring openings, coil springs positioned in the openings in resiliently yieldable engagement with the ends of the latter for permitting relative rotation between the flange and the side plates through a small arc, and separate spring retainers disposed radially outward of the springs in the outer portions of the openings in the side plates.

3. In a clutch plate assembly of the spring center type, a hub having a flange, a friction disk having side plates at opposite sides of the flange, said flange and side plates being provided with normally registering spring openings, coil springs positioned in the openings in resiliently yieldable engagement with the ends of the latter for permitting relative rotation between the flange and the side plates through a small arc, and separate spring retainers connected with the side plates in positions radially outward of the springs in the outer portions of the openings in the side plates.

4. In a clutch plate assembly of the spring center type, a hub having a flange, a friction disk having side plates at opposite sides of the flange, said flange and side plates being provided with normally registering spring openings, coil springs positioned in the openings in resiliently yieldable engagement with the ends of the latter for permitting relative rotation between the flange and the side plates through a small arc, and separate circumferentially curved trough-like sheet metal spring retainers connected with the side plates in positions radially outward of the springs in the outer portions of the openings in the side plates.

5. In a clutch plate assembly of the spring center type, a hub having a flange, a friction disk having side plates at opposite sides of the flange, said flange and side plates being provided with normally registering spring openings, coil springs positioned in the openings in resiliently yieldable engagement with the ends of the latter for permitting relative rotation between the flange and the side plates through a small arc, and separate circumferentially curved trough-like sheet metal spring retainers connected with the side plates in positions radially outward of the springs in the outer portions of the openings in the side plates, said retainers being connected together in strips of two or more, and the connecting portions of the strips being disposed between the side plates about the periphery of the flange.

6. In a clutch plate assembly of the spring center type, a hub having a flange, a friction disk having side plates at opposite sides of the flange, said flange and side plates being provided with normally registering spring openings, coil springs positioned in the openings in resiliently yieldable engagement with the ends of the latter for permitting relative rotation between the flange and the side plates through a small arc, and separate circumferentially curved trough-like sheet metal spring retainers disposed radially outward of the springs in the outer portions of the openings in the side plates, with certain of the retainers in press-fit engagement with the edges of the openings in one of the side plates.

7. In a clutch plate assembly of the spring center type, a hub having a flange, a friction disk having side plates at opposite sides of the flange, said flange and side plates being provided with normally registering spring openings, coil springs positioned in the openings in resiliently yieldable engagement with the ends of the latter for permitting relative rotation between the flange and the side plates through a small arc, and separate transversely curved spring retainers disposed radially outward of the springs in the outer portions of the openings in the side plates, said retainers being centered in the same radial plane as the springs and being transversely curved through an angle of approximately 120° about a center of curvature located in said plane.

8. In a clutch plate assembly of the spring center type, a hub having a flange, a friction disk having side plates at opposite sides of the flange, said flange and side plates being provided with normally registering spring openings, coil springs positioned in the openings in resiliently yieldable engagement with the ends of the latter for permitting relative rotation between the flange and the side plates through a small arc, and separate circumferentially curved trough-like sheet metal spring retainers connected with the side plates in positions radially outward of the springs in the outer portions of the openings in the side plates, both the circumferential curvature and the transverse curvature of the retainers following the path described by the outer sides of the ends of the springs during compression of the latter, whereby to afford uniform support for the outer sides of the ends of the springs in all positions.

9. In a clutch plate assembly of the spring center type, a hub having a flange, a friction disk having side plates at opposite sides of the flange, said flange and side plates being provided with normally registering spring openings, with certain of the spring openings in the flange extended radially inward, spring means positioned in the openings for yieldably permitting relative rotation between the flange and the side plates through a small arc, and rotation limiting members disposed within said inward extensions in certain of the spring openings in the flange in positions radially inward of the spring means in rigid association with the side plates.

10. In a clutch plate assembly of the spring center type, the combination with inner and outer relatively rotatable portions, and coil springs for yieldingly resisting such rotation, of retainers for the springs separate from the inner and outer portions but fixedly associated with one of such portions for guidingly supporting the radially outer sides of the ends of the springs during their yielding movement.

GEORGE I. GOODWIN.